(12) United States Patent
Mehta

(10) Patent No.: US 6,555,078 B1
(45) Date of Patent: Apr. 29, 2003

(54) METHOD OF PREPARING LITHIUM SALTS

(75) Inventor: Vijay Chandrakant Mehta, Gastonia, NC (US)

(73) Assignee: FMC Corporation, Philadelphia, PA (US)

(*) Notice: Subject to any disclaimer, the term of this patent is extended or adjusted under 35 U.S.C. 154(b) by 661 days.

(21) Appl. No.: 08/931,635

(22) Filed: Sep. 16, 1997

Related U.S. Application Data

(60) Provisional application No. 60/026,717, filed on Sep. 26, 1996, and provisional application No. 60/026,738, filed on Sep. 26, 1996.

(51) Int. Cl.$^7$ .............................................. C01D 15/00
(52) U.S. Cl. .................. 423/179.5; 423/277; 423/332; 423/395; 423/400; 423/463; 423/464; 423/518; 423/519.2; 423/515; 423/551; 423/566.2; 423/605; 423/606; 423/641; 423/642; 423/643; 423/646; 562/477; 562/493; 562/578; 562/582; 562/584; 562/588; 562/607; 562/609
(58) Field of Search ................. 423/395, 277, 423/332, 464, 463, 500, 606, 642, 643, 646, 605, 400, 515, 518, 519.2, 551, 566.2, 641, 179.5; 562/477, 493, 578, 582, 584, 588, 589, 607, 609

(56) References Cited

U.S. PATENT DOCUMENTS

| | | | |
|---|---|---|---|
| 3,278,260 A | | 10/1966 | Hermann |
| 3,306,700 A | | 2/1967 | Neipert et al. |
| 3,523,751 A | * | 8/1970 | Burkert et al. .............. 23/63 |
| 4,003,853 A | | 1/1977 | Cherubim et al. |
| 4,116,856 A | | 9/1978 | Lee et al. |
| 4,116,858 A | | 9/1978 | Lee et al. |
| 4,159,311 A | | 6/1979 | Lee et al. |
| 4,216,192 A | * | 8/1980 | Rao et al. ................... 423/366 |
| 4,221,767 A | | 9/1980 | Lee et al. |
| 4,274,834 A | | 6/1981 | Brown et al. |
| 4,291,001 A | | 9/1981 | Repsher et al. |
| 4,347,327 A | | 8/1982 | Lee et al. |
| 4,348,295 A | | 9/1982 | Burba, III |
| 4,348,296 A | | 9/1982 | Bauman et al. |
| 4,348,297 A | | 9/1982 | Bauman et al. |
| 4,376,100 A | | 3/1983 | Lee et al. |
| 4,381,349 A | | 4/1983 | Lee et al. |
| 4,430,311 A | | 2/1984 | Lee et al. |
| 4,461,714 A | | 7/1984 | Burba, III |
| 4,472,362 A | | 9/1984 | Burba, III |
| 4,477,367 A | | 10/1984 | Burba, III |
| 4,540,509 A | | 9/1985 | Burba, III |
| 4,723,962 A | | 2/1988 | Mehta |
| 4,859,343 A | | 8/1989 | Frianeza-Kullberg et al. |
| 4,980,136 A | | 12/1990 | Brown et al. |
| 5,378,445 A | | 1/1995 | Salmon et al. |
| 5,389,349 A | | 2/1995 | Bauman et al. |
| 5,599,516 A | | 2/1997 | Bauman et al. |

FOREIGN PATENT DOCUMENTS

| | | |
|---|---|---|
| DE | 1 183 484 | 12/1964 |
| SE | 101 323 | 4/1941 |

OTHER PUBLICATIONS

Lewis, Hawleys Condensed Chem. Dict., 12th ed., pp. 706, 707, 709, 950, 951, 955, 1051, 1052, 1063, 1993.*
Stenger, Solubilities of . . . in Methanol, J. Chem. Eng. Data, vol. 41, No. 5, pp. 1111–1113, Sep. 1996.*
Perrin, Purification of Laboratory Chemicals, Second Edition, pp. 1, and 46–47, 1980.*
R. T. Sanderson, Principles of Chemistry, pp. 389–398, Mar. 1964.*
Morton, Laboratory Technique in Organic Chemistry, pp. 195–197, 1938.*
PCT International Search Report, PCT/US 97/16811, completed Jan. 13, 1998 by W. Van der Poel.
*Structure of Operation of Dow's New Lithium–Selective Ion–Exchange Resin*, W. Bauman et al., John Wiley & Sons, 1985, pp. 29–34.
*Gmelins Handbuch Der Anorganischen Chemie, Lithium Ergänzungsband*, 1960, Verlag Chemie, Weinheim, DE, p. 262.

* cited by examiner

Primary Examiner—Shailendra Kumar
(74) Attorney, Agent, or Firm—Myers Bigel Sibley & Sajovec, P.A.

(57) ABSTRACT

The present invention provides an inexpensive process for the preparation of lithium salts of formula LiX having a desired or required level of purity using lithium chloride and lithium sulfate. In the process of the invention, a lithium salt selected from lithium chloride, lithium sulfate, and combinations thereof is reacted with NaX or KX in a aqueous, semiaqueous, or organic solution and the precipitated salts are removed to obtain the LiX solution of desired purity. Preferably, a semiaqueous solution containing water and an organic solvent is used at some point in the reaction. The process of the invention eliminates the use of highly acidic materials and thus reduces the cost of raw materials and the need for specialized equipment.

25 Claims, No Drawings

METHOD OF PREPARING LITHIUM SALTS

CROSS-REFERENCE TO RELATED APPLICATIONS

This application is related to commonly owned provisional application Ser. No. 60/026,717, filed Sep. 26, 1996, and provisional application Ser. No. 60/026,738, filed Sep. 26, 1996, and claims the benefit of the earlier filing dates of these applications under 35 U.S.C. §119(e).

FIELD OF THE INVENTION

The present invention is directed to a process for preparing lithium salts, and specifically, to an inexpensive process for preparing lithium salts from low cost lithium chloride and lithium sulfate.

BACKGROUND OF THE INVENTION

Lithium salts have found utility in various applications. For example, lithium nitrate is known for use in ceramics, pyrotechnics, salt baths, heat exchange media, refrigeration systems, rocket propellants and specialized concrete applications. Another useful lithium salt, lithium bromide, is known for use in pharmaceuticals, air conditioning systems, low temperature heat exchange media, drying agent, refrigeration systems, batteries, medicine and as a humectant.

The conventional method of producing many lithium salts is to combine either lithium carbonate or lithium hydroxide with acids containing the desired anion for the lithium salt. For example, the conventional method of producing lithium nitrate is to react lithium carbonate and/or lithium hydroxide with nitric acid. Nevertheless, this process requires high purity raw materials and very expensive plant equipment and metal of construction for the handling of the highly alkaline lithium salts and concentrated nitric acid.

Similarly, the conventional method of producing lithium bromide is to react hydrobromic acid with lithium hydroxide or lithium carbonate. The saturated solution on cooling precipitates lithium bromide monohydrate, which can be dried to the anhydrous salt. Nevertheless, hydrobromic acid is a very irritating colorless gas that fumes strongly in moist air. Furthermore, hydrobromic acid is classified under DOT regulations, as highly corrosive, and highly irritative to eyes, skin and respiratory passages. Therefore, the production of lithium bromide using hydrobromic acid can be quite dangerous.

As described above, the use of highly acidic materials in the formation of lithium salts is undesirable as the materials are generally hazardous and require special equipment. Furthermore, the above processes generally do not produce high yields of the lithium salts being produced and therefore cannot be used where high purity lithium salts are desired. Therefore, there is a need to provide an inexpensive method of increasing the purity of the lithium salts without using highly acidic materials.

SUMMARY OF THE INVENTION

The present invention provides an inexpensive process for the preparation of lithium salts using lithium chloride and lithium sulfate. The process of the invention eliminates the use of highly acidic materials and thus reduces the cost of raw materials and the need for specialized equipment. The process produces lithium salts of desired purity without compromising safety in the production of these salts.

The process of the invention comprises preparing a lithium salt of formula LiX of desired or required purity by reacting a lithium salt selected from lithium chloride, lithium sulfate, and combinations thereof with NaX or KX in an aqueous, semiaqueous and/or organic solution and removing the precipitated solids from the semiaqueous solution to obtain a LiX solution of desired purity. Any combinations of solvents can be used in the invention but preferably the lithium salt and NaX or KX salt are reacted in a semiaqueous solution containing water and an organic solvent. Nevertheless, the semiaqueous reacting step can be preceded by an aqueous reacting step or can be replaced by successive aqueous and organic reacting steps. Typically, the organic solvent in the semiaqueous and organic solutions is selected from aliphatic ketones, aliphatic alcohols, and mixtures thereof. The process of the invention has been found especially useful for producing lithium salts of formula LiX wherein the solubility of LiX in the solution used is greater than the solubility of the sodium or potassium salts produced as by-products in the reacting step.

Use of sulfate salts as part of the starting materials or feed can require a cooling step to precipitate the resultant sodium and/or potassium sulfate salts, such as $Na_2SO_4 \cdot 10H_2O$, $K_2SO_4$, $KLiSO_4 \cdot H_2O$, $NaLiSO_4 \cdot H_2O$, and the like. The use of chloride salts as starting materials or feed can require higher temperatures to reject the resultant sodium salt NaCl and lower temperatures for the resultant potassium salt KCl from aqueous metathesis salting out. To purify $LiNO_3$ and/or LiBr salt solutions, a solvent step metathesis step can be required for precipitation removal of sodium and/or potassium as chloride and/or sulfate salts.

In a specific embodiment of the invention, the process for preparing a lithium salt of formula LiX having a desired or required purity comprises dissolving lithium chloride, lithium sulfate, or a mixture thereof and a NaX salt, KX salt, or mixture thereof, in an aqueous solution and filtering the solution to remove the precipitated sodium and potassium salts. An aliphatic ketone, an aliphatic alcohol, or a mixture thereof, is then added to the solution to form a semiaqueous solution, and the precipitated sodium and potassium salts are again filtered from the solution. In addition, a monovalent cation sulfate salt can be added to the semiaqueous solution to cause the salting out or precipitation of undesired sodium and potassium salts from the solution thereby purifying the solution. The organic solvent is then removed and the resulting LiX solution of desired purity is recovered. The LiX solution can then be dried where solid LiX salt is desired as the end product or stored and sold in solution.

These and other features and advantages of the present invention will become more readily apparent to those skilled in the art upon consideration of the following detailed description which describes both the preferred and alternative embodiments of the present invention.

DETAILED DESCRIPTION OF THE INVENTION

The process of the invention comprises preparing a lithium salt of formula LiX having a desired or required purity by reacting a lithium salt selected from lithium chloride, lithium sulfate, and combinations thereof with NaX or KX in an aqueous, semiaqueous or organic solution and removing the precipitated solids from the solution to obtain a LiX solution of desired purity. Any combination of solvents can be used in accordance with the invention. Preferably, a semiaqueous solution is used containing water and an organic solvent. The reaction can also be initiated in an aqueous solution and then continued in either a semiaqueous or an organic solution to provide the LiX salts of the invention. As used herein, and as will be appreciated by the skilled artisan, the term "salt" unless otherwise specifically defined can refer to a salt provided in solid or liquid form (for example as brine solutions).

The lithium chloride and lithium sulfate salts used in the process are inexpensive and readily available in anhydrous form, hydrated form, or in solution. Typically, the lithium chloride is obtained in purified form as a liquid as well as an anhydrous salt from geothermal brine deposits such as those in Chile and Argentina by selective adsorption and solar evaporation. Lithium sulfate is obtained from spodumene ore by conventional roasting, acid leach and purification steps, and from brine by conventional routes. The NaX or KX salts are also available in anhydrous form, hydrated form, or in solution and can be available as mixtures of NaX and KX. Advantageously, the lithium chloride, lithium sulfate, NaX and KX can be used in liquid and well as solid form. Thus, where the transport of the raw materials is not a concern, the lithium chloride, lithium sulfate, NaX and KX can be used in liquid form and thus do not require drying. As a result, the cost of the raw materials used in the process is reduced.

The process of the invention is preferably initiated by dissolving lithium chloride, lithium sulfate, or a mixture thereof and a NaX salt, KX salt, or a mixture thereof, in an aqueous solution. The dissolution of these reactants occurs by dissolving lithium chloride or lithium sulfate in a NaX or KX solution, dissolving NaX or KX in a lithium chloride or lithium sulfate solution, or mixing an aqueous solution of lithium chloride or lithium sulfate with an aqueous solution of NaX or KX. In addition, the solution can be heated and/or agitated to facilitate the dissolution of the salts in the solution. Preferably, the dissolving step is conducted at between 0 and 120° C. and under atmospheric or subatmospheric pressure (5 to 25 mm Hg).

As the salts are combined in solution, the lithium chloride and lithium sulfate reacts with the NaX and KX salts in a substitution or metathesis reaction to form LiX as the desired end product and NaCl, $Na_2SO_4$, KCl, $K_2SO_4$ and the like as by-products. The LiX is preferably more soluble in the aqueous solution than the sodium and potassium salts, i.e. the salt by-products and any excess NaX or KX present in the solution, thereby causing the sodium and potassium salts to precipitate out of solution before the LiX salt. The solution is often concentrated such as by evaporating off the water or other means to thereby increase precipitation of the sodium and potassium salts. Preferably, the solution is concentrated such that the solution contains from greater than 0 to about 4 moles of water per mole of LiX. More preferably, the aqueous solution contains between about 1 mole and 3 moles of water per mole of LiX. The amount of water in solution is preferably sufficient to keep the LiX in solution below or close to saturation at the operating temperature. Typically, the pH of the aqueous solution is between about 5 and 10, preferably between about 6 and 8. In addition, where the solution has been heated, the solution can be cooled to help precipitate more sodium and potassium salts from the solution. Once the sodium and potassium salts precipitate, these salts can be removed from the aqueous solution by continuously filtering the solution or other suitable means.

Once the partially precipitated sodium and potassium salts have been removed from the aqueous solution for further purification, an organic solvent is added to the aqueous solution to form a semiaqueous solution. Alternatively, the water can be removed completely in the solution and the organic solvent added to form an organic solution. Typically, the solution is agitated and can be heated to facilitate the formation of the semiaqueous or organic solution. It can also be beneficial in the case of the semiaqueous solution to dilute the solution by adding water to the solution to bring the amount of dissolved solids in the solution to less than 50 weight percent prior to adding the organic solvent. The preferred organic solvents for use in the process of the invention are aliphatic ketones (e.g. primary and secondary C1–C10 ketones), aliphatic alcohols (e.g. primary and secondary C1–C10 alcohols), and mixtures thereof. Exemplary ketones and alcohols include without limitation acetone, dimethylketone, diethylketone, methanol, ethanol, propanol, pentanol, hexanol, and the like, and preferably is acetone, methanol and/or ethanol, and more preferably acetone and/or methanol.

Preferably, the amount of organic solvent in the semiaqueous or organic solution is greater than 0 moles and less than 10 moles per mole of LiX. More preferably, the amount of organic solvent is between about 0.25 moles and about 3 moles per mole of LiX. The amount of water present in the semiaqueous solution is as described above. Preferably, the amount of water (semiaqueous solution) and organic solvent in the semiaqueous or organic solution is sufficient to keep the LiX in solution below or close to saturation at the operating temperature. The addition of the organic solvent and filtration of the precipitated solids is typically conducted at between 0 and 60° C., preferably, between about 0° C. and 30° C., and under atmospheric or subatmospheric pressure (0 to 25 mm Hg). In addition, the pH of the semiaqueous solution is typically between about 5 and 10, preferably between about 7 and 9.

Once the organic solvent has been added to the solution, additional sodium and potassium salts precipitate out of the semiaqueous solution. In addition to the organic solvent, a sulfate salt having a monovalent cation, e.g., an alkali metal sulfate, such as but not limited to $Na_2SO_4$, $Na_2SO_4 \cdot 10H_2O$, $LiSO_4$, $LiSO_4 \cdot H_2O$, $KLiSO_4 \cdot 1/2H_2O$, $K_2SO_4$, and $NaLiSO_4 \cdot H_2O$, and the like, can be added to the solution with the organic solvent or prior to drying the aqueous solution to facilitate precipitation of the sodium and potassium salts. Preferably, the added sulfate salt is sodium sulfate or potassium sulfate to correspond to the salt originally added in the process to provide the X anion for the LiX salt. The precipitated salts are removed from the semiaqueous solution such as by filtering. In addition, where elevated temperatures are used for the semiaqueous solution, the solution temperature can be decreased to cause greater precipitation of the sodium and potassium salts.

Once the precipitated solids have been substantially removed from the lithium solution, the organic solvent is removed next from the solution. The organic solvent can be recycled into the process. The recovery of the organic solvent from the solution is preferably facilitated by concentrating the solution such as by heating the solution to evaporate (distillation) the organic solvent. The resulting LiX solution or salt can have a purity of 95% or greater, preferably 99% or greater, and is recovered in the process. When a semiaqueous solution is used, the LiX solution can then be concentrated to increase the amount of solids in the solution or dried to form a LiX salt of desired purity.

Although the process of the invention is described as a two-step process in which precipitation occurs first in an aqueous solution and then in a semiaqueous or organic solution, the process can be conducted as a one-step process wherein only the semiaqueous solution is used under the semiaqueous conditions described above. In particular, the one-step process is preferred wherein LiX is less soluble in water than the sodium and potassium salts but more soluble in the semiaqueous solution than the sodium and potassium salts. In addition, the process of the invention can be conducted in a batch, semi-batch or continuous process to produce the LiX salts. Preferably, for the large-scale production of lithium salts, a continuous or semi-batch process is used in accordance with the invention.

The present invention can be used to form various LiX salts. Preferably, as will be readily understood to one skilled in the art, the process of the invention is used to produce LiX salts having a greater solubility in the solutions used than the sodium or potassium salts present in these solutions. In particular, the process of the invention can be used to produce a lithium salt of formula LiX wherein X is an anion selected from nitrate, bromide, chloride, iodide, borate (tetraborate), acetate, pentaborate, acetylsalicylate, amide, benzoate, chlorate, perchlorate, chloroplatinate, chromate, citrate, dichromate, fluosilicate, fluosulfonate, formate, hydroxide, hypochlorite, iodate, lactate, permanganate, methoxide, molybdate, nitrite, niobate, oxalate, oxide, salicylate, sulfate, sulfide, sulfite, tartrate, thiocyanate, dithionate, tungstate, and vanadate. Preferably, the process of the invention is used to make lithium nitrate or lithium bromide.

The process of the invention allows LiX to be produced from NaX and KX salts which are generally more readily available and are therefore less expensive than the related LiX salts. For example, sodium nitrate (also called Chilean nitrate or Chile saltpeter) is abundantly available in South American salt deserts and potassium nitrate is made from sodium nitrate in Chile. Sodium bromide is recovered as a by-product from solutions obtained during bromination, bromo-oxidation and hydrolysis of organic bromide compounds. Furthermore, large amounts of potassium bromide are made from the neutralization of HBr with KOH or $K_2CO_3$. Any excess NaX and KX salts which are recovered in the process can be separated and recycled into the process.

Another advantage of the process of the invention is that high purity raw materials are not required to produce the LiX solutions or salts having the desired or required purity. Specifically, because undesired salts generally precipitate out of the solution during the process of the invention, impurities can be present in the raw materials. Thus, more expensive high purity raw materials are not necessary in order to produce LiX having a desired purity according to the invention.

A further advantage of the process is that the salt by-products, i.e., the sodium and potassium salts, are useful chemicals and thus are not discarded as waste. For example, potassium chloride is a raw material for manufacturing potassium nitrate from Chile saltpeter ($NaNO_3$) and potassium sulfate is a very valuable potash fertilizer. In addition, NaCl (table salt) and $Na_2SO_4$ (salt cake) have uses which are well known in the art.

The present invention provides an inexpensive process for the preparation of lithium salts using lithium chloride and lithium sulfate. The process of the invention eliminates the use of highly acidic materials and thus reduces the cost of raw materials and the need for specialized equipment. Therefore, the process produces lithium salts having a desired or required level of purity without compromising safety in the production of these salts. Additionally, lithium chloride and lithium sulfate can be used in both solid and solution form in the process and thus do not have to be dried out prior to use. Advantageously, the by-products of the process of the invention have other useful applications and thus the process produces little waste.

The present invention will now be further illustrated by the following non-limiting examples. All percentages unless otherwise indicated are on a per weight basis.

EXAMPLE 1

Five hundred grams of water in a 1000 ml beaker was heated to 60° C. and 210 g $NaNO_3$ was added with slow agitation to obtain a clear solution. Next, 100 g of anhydrous high purity LiCl was added slowly to the $NaNO_3$ solution with agitation to again obtain a clear solution. Next, the brine was allowed to concentrate by removing water and salt formation started after removal of about 150–200 g water. The evaporation of water and the salt removal by filtration of the warm slurry was continued until the final filtrate reached 350 g. The salt cake was washed with fine water spray and the wash was recycled with the mother liquor. Next, the filtrate was allowed to cool to 20° C. and filtered to remove solids. The filtrate (about 295 g) and the total solids (about 142 g) was recovered and sampled for analysis. The analysis of the filtrate showed 5.58% $Li^+$, 1.66% $Na^+$, 54.39% $NO_3^-$ and 0.22% $Cl^-$. Next, 200 ml of the filtrate was diluted with water to about 240 ml to bring the total dissolved solids to below 50%. One hundred milliliters of dimethylketone was added to the filtrate with slow agitation and at room temperature. The mixture was allowed to agitate for 60 minutes and then filtered to remove solids. The filtrate was concentrated to recover dimethylketone at low pressure and a temperature between 25 and 60° C. The final solution once free from organic solvent was analyzed and contained 4.64% $Li^+$, 0.105% $Na^+$, 41.369% $NO_3^-$, and less than 0.2% $Cl^-$.

EXAMPLE 2

Four hundred twenty-five (425) grams of water in a 1000 ml beaker was heated to 65° C. and 450 g $NaNO_3$ was added to the beaker and dissolved completely. Next, 215 g anhydrous LiCl was dissolved in 375 g of water in a separate beaker. The LiCl solution was added slowly to the $NaNO_3$ solution with agitation. The resulting solution turned into a slurry indicating precipitation of the NaCl salt. The solution was concentrated by removing about 200 g of water. The 1265 g slurry was filtered hot and the filter cake was washed with 30 g of a water spray. The resulting wet cake was dried and weighed 123 g. The filtrate was concentrated further to 980 g by removing 195 g of water. The resulting slurry was filtered and the filter cake was washed with 20 g of water. The filter cake was dried and weighed 32 g. Next, the 968 g filtrate and wash were concentrated in a similar fashion in two steps at 90° C. to obtain 620 g filtrate and 90 g washed dry salts. A total of 45 g of water was used to wash the filter cake in these two steps. The filtrate (620 g) and collected salts were analyzed using conventional techniques and contained the following:

|  | Hot Filtrate | Salts |
| --- | --- | --- |
| $Li^+$ | 5.60% | 0.20% |
| $Na^+$ | 4.65% | 37.90% |
| $NO_3^-$ | 52.22% | 1.79% |
| $Cl^-$ | 5.50% | 58.42% |

EXAMPLE 3

Twenty-three grams of Glauber salt ($Na_2SO_4:10H_2O$) was added to 310 g of the hot filtrate from Example 2 and the solution was allowed to concentrate to dryness using rotovap. The dried salts were cooled to 50° C. Next, 250 ml of absolute methyl alcohol was added to the dried salts with agitation. The slurry was agitated between at room temperature and 50° C. to dissolve $LiNO_3$. After three hours of agitation at any given temperature between 10° C. and 50° C., the slurry was filtered to remove undissolved salts. The filtrate and the solids were dried under vacuum to recover alcohol for recycling into the process and both of the resulting solids were analyzed. The results were as follows:

|  | $LiNO_3$ solids from alcohol filtrate | Undissolved Salts |
|---|---|---|
| Wt. | 170 g | 55 g |
| $Li^+$ | 9.900% | 0.90% |
| $Na^+$ | 0.380% | 30.90% |
| $NO_3^-$ | 87.260% | 24.60% |
| $Cl^-$ | 0.068% | 30.90% |
| $SO_4^{2-}$ | 0.005% | 12.30% |

EXAMPLE 4

Twenty-three grams of Glauber salt ($Na_2SO_4:10H_2O$) was added to 310 g of the hot filtrate from Example 2 with agitation. The solution was cooled to 50° C. and 250 ml of ethyl alcohol was added to the solution with agitation. The solution was allowed to cool down to 20° C. After three hours of agitation at 20° C., the slurry was filtered to remove salts. The alcohol was recovered from the process for recycling into the process and the solution and filtered solids were analyzed. The results were as follows:

|  | $LiNO_3$ soln. from alcohol filtrate | Undissolved Salts |
|---|---|---|
| Wt. | 350 g | 47 g |
| $Li^+$ | 4.850% | 0.77% |
| $Na^+$ | 0.472% | 34.05% |
| $NO_3^-$ | 44.145% | 15.70% |
| $Cl^-$ | 0.290% | 34.15% |
| $SO_4^{2-}$ | 0.009% | 14.32% |

EXAMPLE 5

Five hundred grams of water in a 1000 ml beaker was heated to 60° C. and 250 g anhydrous NaBr was added to obtain a clear solution. Next 100 g of anhydrous LiCl was added slowly with moderate agitation. The mix was allowed to agitate for one hour at between 60°C. and 80° C. Fine white solids were precipitated from the metathesis reaction. Next, the slurry was concentrated by removing water under low pressure and the slurry was filtered simultaneously to remove solids. The solid wet cake was washed with fine water spray to recover LiBr entrainment. The filtrate and the wash were recycled to the evaporator. The evaporation and filtration with washing of the filter cake was continued until the final filtrate was about 320 g. The filtrate was allowed to cool to 20° C. and filtered again to remove salts from the solution. The clear brine filtrate (about 250 g) and the total solids (about 152 g) were sampled for analysis. The chemical analysis of the brine solids showed 5.2% $Li^+$, 0.153% $Na^+$, 53% $Br^-$, and 0.064% $Cl^-$. The filtrate from evaporation and cooling can then be mixed with diketones, such as acetone, and/or a low carbon primary alcohol, such as methanol, to precipitate out excess sodium halide salts to obtain a final product solution of LiBr with very low sodium and chloride content.

It is understood that upon reading the above description of the present invention, one skilled in the art could make changes and variations therefrom. These changes and variations are included in the spirit and scope of the following appended claims.

That which is claimed:

1. A method for preparing a lithium salt of formula LiX, comprising:
   reacting lithium salt selected from lithium chloride, lithium sulfate, and combinations thereof with NaX or KX in an aqueous solution;
   adding an organic solvent to the aqueous solution to produce a semiaqueous solution; and
   removing the precipitated solids from the semiaqueous solution to obtain a LiX solution.

2. The method of claim 1 wherein said adding step comprises adding an organic solvent selected from aliphatic ketones, aliphatic alcohols, and mixtures thereof.

3. The method of claim 1 further comprising, prior to said adding step, the step of solution removing the precipitated solids from the aqueous solution.

4. The method of claim 1 wherein X of the NaX or KX salts in the reacting step is selected such that the solubility of LiX in the aqueous solution is greater than the solubility of the sodium or potassium salts produced in the reacting step and the solubility of LiX in the semiaqueous solution is greater than the solubility of the sodium or potassium salts produced in the reacting step.

5. The method of claim 1 wherein X is an anion selected from nitrate, bromide, chloride, iodide, acetate, borate (tetraborate), pentaborate, acetylsalicylate, amide, benzoate, chlorate, perchlorate, chloroplatinate, chromate, citrate, dichromate, fluosilicate, fluosulfonate, formate, hydroxide, hypochlorite, iodate, lactate, permanganate, methoxide, molybdate, nitrite, niobate, oxalate, oxide, salicylate, sulfate, sulfide, sulfite, tartrate, thiocyanate, dithionate, tungstate, and vanadate.

6. A method for preparing lithium nitrate or lithium bromide, comprising:
   reacting lithium salt selected from lithium chloride, lithium sulfate, and combinations thereof with $NaNO_3$, NaBr, $KNO_3$ or KBr in an aqueous, semiaqueous or organic solution; and
   removing the precipitated solids from the solution to obtain a $LiNO_3$ or LiBr solution.

7. The method of claim 1 further comprising the step of adding a sulfate salt having a monovalent cation to the semiaqueous solution.

8. A method for preparing a lithium salt of formula LiX, comprising:
   reacting lithium salt selected from lithium chloride, lithium sulfate, and combinations thereof with NaX or KX salt in an aqueous solution;
   removing the precipitated solids from the aqueous solution;
   drying the aqueous solution and recovering the dried salts;
   preparing an organic solution comprising the salts from said drying step; and
   removing the precipitated solids from the organic solution.

9. A method for preparing a high purity lithium salt of formula LiX comprising:
   dissolving lithium chloride, lithium sulfate, or a mixture thereof and a NaX salt, KX salt, or a mixture thereof, in an aqueous solution;

filtering the solution to remove the sodium and potassium salts;

adding an organic solvent selected from an aliphatic ketone, an aliphatic alcohol and a mixture thereof, to form a semiaqueous solution;

filtering the precipitated sodium and potassium salts from the semiaqueous solution;

removing the organic solvent from the solution; and recovering the resulting LiX solution.

10. The method of claim 9 further comprising the step, after said dissolving step, of concentrating the salts in the solution thereby increasing precipitation of the sodium and potassium salts.

11. The method of claim 9 wherein the step of removing the organic solvent from the solution comprises concentrating the solution to facilitate removal of the organic solvent from the solution.

12. The method of claim 9 wherein X is selected such that the solubility of LiX in the aqueous and semiaqueous solutions is greater than the solubility of the sodium or potassium salts produced in the reacting step.

13. The method of claim 9 wherein X is an anion selected from nitrate, bromide, chloride, iodide, acetate, borate (tetraborate), pentaborate, acetylsalicylate, amide, benzoate, chlorate, perchlorate, chloroplatinate, chromate, citrate, dichromate, fluosilicate, fluosulfonate, formate, hydroxide, hypochlorite, iodate, lactate, permanganate, methoxide, molybdate, nitrite, niobate, oxalate, oxide, salicylate, sulfate, sulfide, sulfite, tartrate, thiocyanate, dithionate, tungstate, and vanadate.

14. A method for preparing high purity lithium nitrate or lithium bromide, comprising:

dissolving lithium chloride, lithium sulfate, or a mixture thereof and a NaX salt, KX salt, or a mixture thereof, wherein X is nitrate or bromide, in an aqueous solution;

filtering the solution to remove the sodium and potassium salts:

adding an organic solvent selected from an aliphatic ketone, an aliphatic alcohol and a mixture thereof, to form a semiaqueous solution;

filtering the precipitated sodium and potassium salts from the semiaqueous solution;

removing the organic solvent from the solution: and recovering the resulting lithium nitrate or lithium bromide solution.

15. The method of claim 9 further comprising the step of drying the LiX solution to form a LiX salt having a desired level of purity.

16. The method of claim 9 wherein said step of dissolving comprising heating thee solution and said method further comprises the step of heating and cooling and filtering the solution to remove additional sodium and potassium salts prior to said step of adding an organic solvent.

17. The method of claim 9 further comprising the step of diluting the solution to bring the amount of dissolved solids in the solution to less than 50 weight percent prior to the step of adding an organic solvent.

18. The method of claim 9 wherein after said step of adding the organic solvent, the amount of water in the semiaqueous solution is greater than 0 moles and less than 4 moles per mole of LiX and the amount of organic solvent in the solution is greater than 0 moles and less than 10 moles per mole of LiX.

19. The method of claim 9 wherein the amount of water in solution during said first filtering step is sufficient to keep the LiX in solution below or close to saturation at the operating temperature.

20. The method of claim 9 wherein the amount of water and organic solvent in the solution during said second filtering step is sufficient to keep the LiX in solution below or close to saturation at the operating temperature.

21. The method of claim 9 wherein the first filtering step is conducted at between 0 and 120° C. and under atmospheric or subatmospheric pressure.

22. The method of claim 9 wherein the second filtering step is conducted at between 0 and 60° C. under atmospheric or subatmospheric pressure.

23. The method of claim 9 further comprising the step of adding a sulfate salt having a monovalent cation to the semiaqueous solution.

24. The method of claim 23, wherein said monovalent cation sulfate salt is selected from $Na_2SO_4$, $Na_2SO_4.10H_2O$, $LiSO_4$, $LiSO_4.H_2O$, $KLiSO_4.1/2H_2O$, $K_2SO_4$, and $NaLiSO_4.H_2O$.

25. A method for preparing lithium nitrate or lithium bromide, comprising:

reacting lithium salt selected from lithium chloride, lithium sulfate, and combinations thereof with NaX or KX, wherein X is nitrate or bromide, in an aqueous solution;

adding an organic solvent to the aqueous solution to produce a semiaqueous solution; and removing the precipitated solids from the semiaqueous solution to obtain a LiX solution.

* * * * *